United States Patent
Sawa (10) Patent No.: US 9,591,153 B2
(45) Date of Patent: Mar. 7, 2017

(54) IMAGE PROCESSING APPARATUS AND METHOD OPERATION ACCORDING TO PHOTOGRAPHED IMAGE DATA CONTENT

(71) Applicant: KYOCERA Document Solutions Inc., Osaka-shi, Osaka (JP)

(72) Inventor: Naoki Sawa, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/924,505

(22) Filed: Oct. 27, 2015

(65) Prior Publication Data
US 2016/0127582 A1    May 5, 2016

(30) Foreign Application Priority Data
Oct. 31, 2014    (JP) .................................. 2014-222678

(51) Int. Cl.
*H04N 1/00*    (2006.01)
*H04N 1/44*    (2006.01)

(52) U.S. Cl.
CPC ..... *H04N 1/00336* (2013.01); *H04N 1/00403* (2013.01); *H04N 1/442* (2013.01)

(58) Field of Classification Search
None
See application file for complete search history.

(56) References Cited

U.S. PATENT DOCUMENTS

| 5,436,639 A * | 7/1995 | Arai | G06F 3/033 345/156 |
|---|---|---|---|
| 2006/0092455 A1* | 5/2006 | Maeda | H04N 1/00204 358/1.15 |
| 2014/0333585 A1* | 11/2014 | Suzuki | G06F 3/0425 345/175 |
| 2016/0037009 A1* | 2/2016 | Ito | H04N 1/00923 358/1.14 |

FOREIGN PATENT DOCUMENTS

| JP | 2006172439 A | 6/2006 |
|---|---|---|
| JP | 2008129054 A | 6/2008 |
| JP | 2009113361 A | 5/2009 |
| JP | 2009147452 A | 7/2009 |
| JP | 2009157455 A | 7/2009 |
| JP | 2013254437 A | 12/2013 |

* cited by examiner

*Primary Examiner* — Fan Zhang
(74) *Attorney, Agent, or Firm* — Alleman Hall McCoy Russell & Tuttle LLP (57) ABSTRACT

An image processing apparatus includes a camera, a document sheet image determining portion, an operation determining portion, and an image processing portion. The document sheet image determining portion determines whether or not document sheet image data is contained in photographic image data that has been obtained by photographing with the camera installed on the image processing apparatus. The operation determining portion determines whether or not operation image data is contained in the photographic image data, the operation image data showing a pattern of user's hand and corresponding to an operation for processing the document sheet image data. The image processing (Continued)

portion executes the processing of the document sheet image data based on the operation corresponding to the operation image data when it is determined that the document sheet image data and the operation image data are contained in the photographic image data.

6 Claims, 7 Drawing Sheets

IMAGE PROCESSING APPARATUS AND METHOD OPERATION ACCORDING TO PHOTOGRAPHED IMAGE DATA CONTENT

INCORPORATION BY REFERENCE

This application is based upon and claims the benefit of priority from the corresponding Japanese Patent Application No. 2014-222678 filed on Oct. 31, 2014, the entire contents of which are incorporated herein by reference.

BACKGROUND

The present disclosure relates to an image processing apparatus and an image processing method.

In recent years, security measures are required to be taken for information devices. For example, a user authentication system is introduced to an image processing apparatus such as a printer, a copier, and a multifunction peripheral. In this user authentication system, a user name (or a group name) and a password are registered in advance, and when the user inputs a user name and the like via an operation panel, a user authentication is performed in which the input user name and the like are compared with the registered data.

However, in such a user authentication system, the user needs to perform a user authentication procedure such as inputting characters of a user name (or a group name) and a password, before using a function of the image processing apparatus such as a copy function or a facsimile transmission function. This procedure extremely reduces the user's convenience. In addition, another problem of such a system is that the security cannot be maintained if account information is revealed to others, wherein the account information is a combination of a user name (or a group name) and a password.

In a typical image forming system, a personal authentication is performed by an authentication control portion, not by an operation panel means, by using an authentication signal from an external authentication device. In addition, according to another typical print system, a face image authentication is performed on an image that has been photographed by a photographing device, and a predetermined file is printed based on the result of the face image authentication.

SUMMARY

An image processing apparatus according to an aspect of the present disclosure includes a camera, a document sheet image determining portion, an operation determining portion, and an image processing portion. The document sheet image determining portion determines whether or not document sheet image data is contained in photographic image data that has been obtained by photographing with the camera installed on the image processing apparatus. The operation determining portion determines whether or not operation image data is contained in the photographic image data, the operation image data showing a pattern of user's hand and corresponding to an operation for processing the document sheet image data. The image processing portion executes the processing of the document sheet image data based on the operation corresponding to the operation image data when the document sheet image determining portion determines that the document sheet image data is contained in the photographic image data and the operation determining portion determines that the operation image data is contained in the photographic image data.

An image processing method according to another aspect of the present disclosure includes a document sheet image determining step, an operation determining step, and an image processing step. The document sheet image determining step determines whether or not document sheet image data is contained in photographic image data that has been obtained by photographing with a camera installed on an image processing apparatus. The operation determining step determines whether or not operation image data is contained in the photographic image data, the operation image data showing a pattern of user's hand and corresponding to an operation for processing the document sheet image data. The image processing step executes the processing of the document sheet image data based on the operation corresponding to the operation image data when the document sheet image determining step determines that the document sheet image data is contained in the photographic image data and the operation determining step determines that the operation image data is contained in the photographic image data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of an image processing apparatus and an image processing method of the present disclusure, with reference to the drawings, for the understanding of the disclosure. It should be noted that the following embodiment is an example of a specific embodiment of the present disclosure and should not limit the technical scope of the present disclosure. It should also be noted that the alphabet "S", which is put before a numeral in the flowcharts, means "step".

The following explains a multifunction peripheral (MFP) 100 as an example of an embodiment of the image processing apparatus of the present disclosure. It is noted that the multifunction peripheral 100 is an apparatus that has functions of, for example, a facsimile, a copier, a scanner, and a printer.

Figure 1:
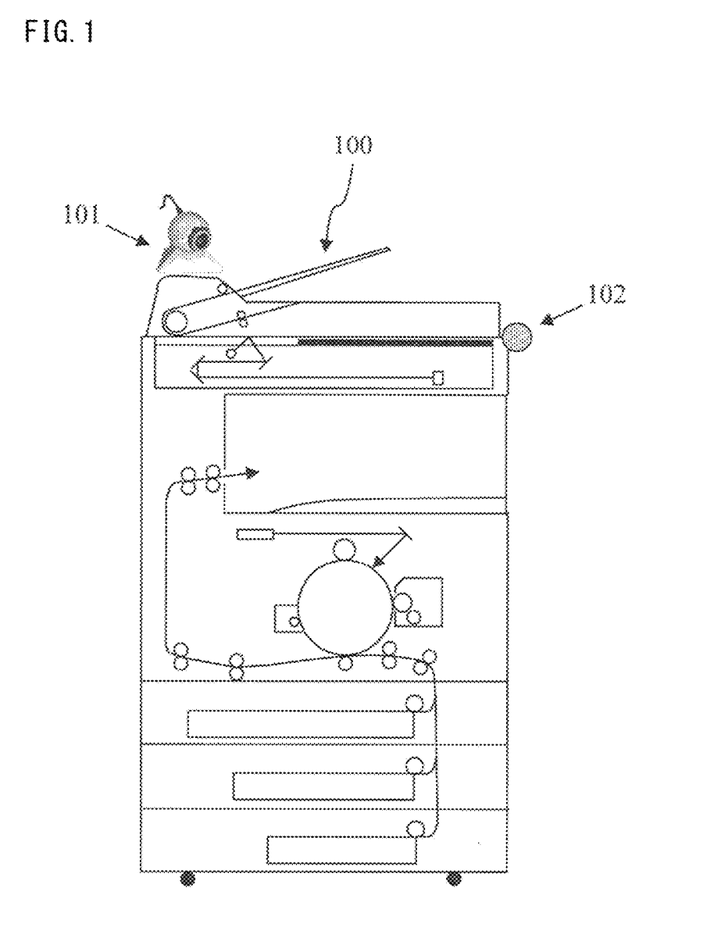
FIG. 1 shows a whole internal configuration of a multifunction peripheral according to an embodiment of the present disclosure.

The multifunction peripheral 100 includes an operation portion, an image reading portion, an image processing portion, a conveyance portion, and a fixing portion (these portions are not shown). As shown in FIG. 1, upon receiving setting conditions of a print job and an execution input of the print job from the user via the operation portion, the multifunction peripheral 100 drives the image reading portion, image processing portion, conveyance portion, fixing portion and the like, and executes the print job. In addition, the image processing portion of the multifunction peripheral 100 transmits and receives image data to/from a predetermined terminal apparatus.

In addition, the multifunction peripheral 100 includes a miniature camera 101, and obtains, via the miniature camera 101, image data of the user or image data of a document held over by the user. Furthermore, the multifunction peripheral 100 includes a sound/voice input portion 102, and obtains the sound/voice of the user via the sound/voice input portion 102.

Figure 2:
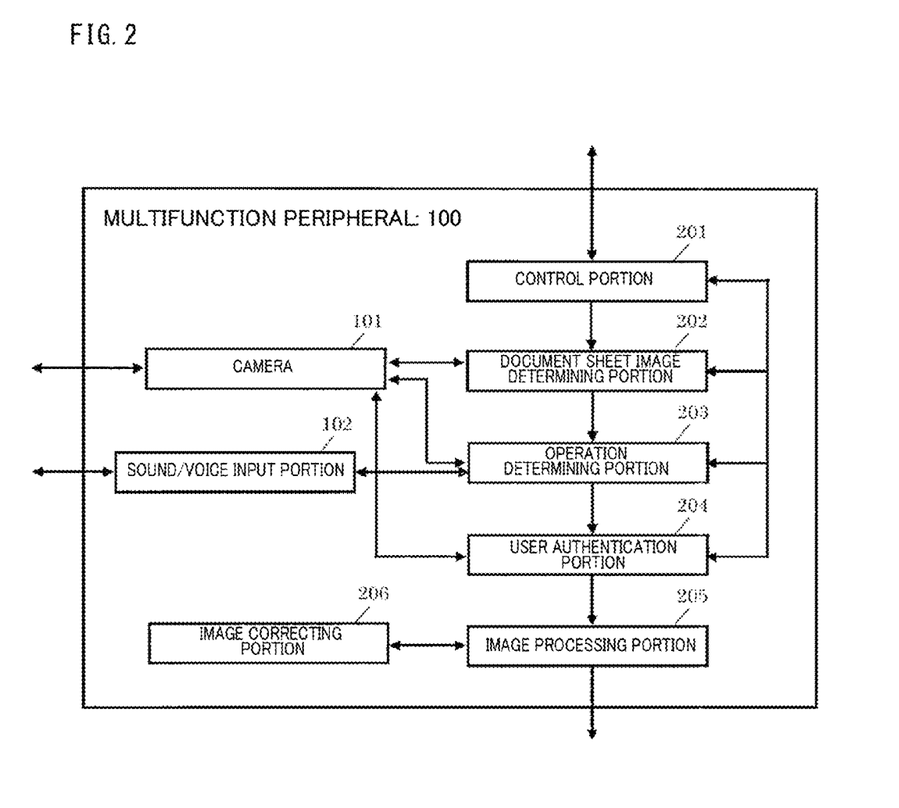
FIG. 2 shows a functional block of the multifunction peripheral according to an embodiment of the present disclosure.

The multifunction peripheral 100 includes a control portion 201. Although not shown, in the control circuit of the control portion 201, at least a CPU (Central Prossing Unit), a ROM (Read Only Memory), a RAM (Random Access Memory), a HDD (Hard Disk Drive), and drivers for driving corresponding portions are connected by an internal bus.

As one example, the CPU of the control portion 201 uses the RAM as a working area, executes programs stored in the ROM and the HDD, receives data, instructions, signals, and commands from the drivers based on the execution results, and controls the operations of the portions related to the print job execution. In addition, a document sheet image determining portion 202, an operation determining portion 203, a user authentication portion 204, an image processing portion 205, and and image correcting portion 206 (see FIG. 2) other than the above-described portions are realized when the CPU executes the programs, wherein the portions 202-206 are described below. The ROM, the RAM, the HDD and/or the like store programs and data for realizing the portions 202-206 that are described below. Specific processes of the portions 202-206 are realized when the CPU executes the programs by using the data.

Meanwhile, a typical conventional technology has a problem that an authentication device (hardware) dedicated to authentication is required for performing the authentication. For example, when a face authentication system is introduced, a high-sensitivity camera needs to be prepared. However, if the high-sensitivity camera is used only for the authentication, the cost increases. In addition, the conventional technology has a problem that since the high-sensitivity camera is used only to photograph faces, the cost-performance is bad. On the other hand, in the multifunction peripheral 100, the user needs to perform the document sheet reading operation. Thus, as in the conventional technology, the user needs to place the document sheet on an image reading table or an automatic document sheet feeding portion. A problem in this configuration is that after placing a document sheet on the image reading table or the like and completing the image reading, the user may forget to collect the document sheet. This is a security problem. As described below, the multifunction peripheral 100 of the present disclosure is configured to facilitate reading of an image of a document sheet and operation input, without causing the above-described problem to occur.

Figure 3:
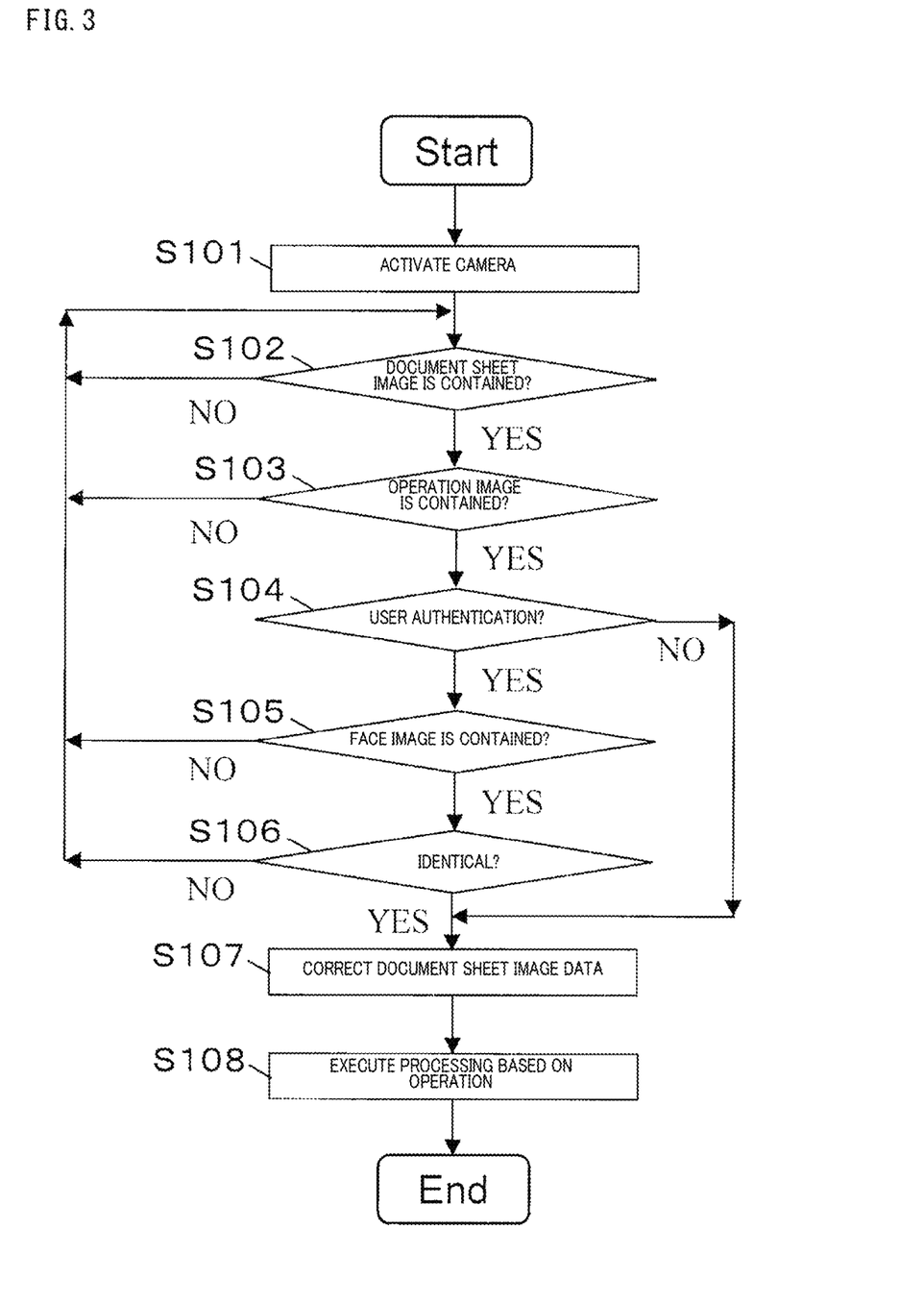
FIG. 3 is a flowchart showing an execution procedure according to an embodiment of the present disclosure.

The following describes the configuration and execution procedure of the embodiment of the present disclosure with reference to FIG. 2 and FIG. 3. First, when the user powers on the multifunction peripheral 100, the control portion 201 of the multifunction peripheral 100 activates the portions 202-206, and activates the camera 101 (FIG. 3: S101). The activated camera 101 starts obtaining image data.

In addition, after causing the camera 101 to start obtaining image data, the control portion 201 sends a notification thereof to the document sheet image determining portion 202. Upon receiving the notification, the document sheet image determining portion 202 determines whether or not the image data of an image photographed by the camera 101 contains document sheet image data (FIG. 3: S102).

Figure 4A:
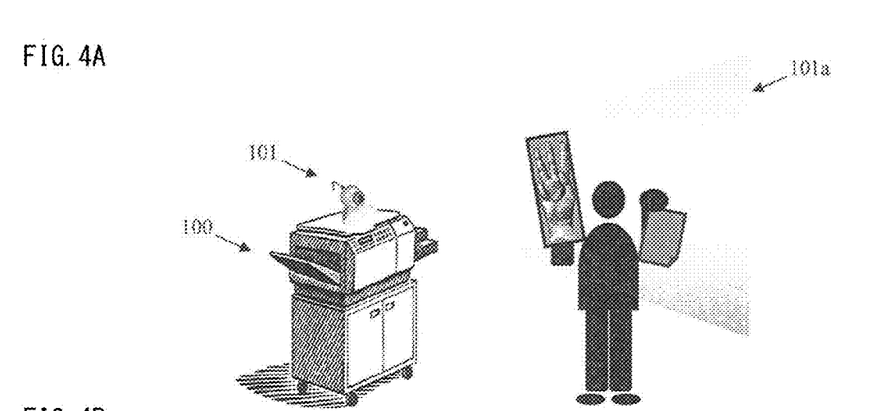
FIG. 4A shows an example of a case where document sheet image data and operation image data are obtained by photographing according to an embodiment of the present disclosure.

For example, as shown in FIG. 4A, when the user enters a photographing area 101a (image take-in area) of the camera 101, the camera 101 obtains photographic image data that contains an image of the user, and the document sheet image determining portion 202 determines whether or not the photographic image data contains document sheet image data.

Here, there is no restriction in particular to the method by which the document sheet image determining portion 202 makes the determination. For example, the camera 101 may obtain photographic image data on a regular basis, and the document sheet image determining portion 202 may determine whether or not the obtained photographic image data includes characteristic points of document sheet image data that have been registered in advance in a predetermined memory. The characteristic points of document sheet image data may correspond to, for example, the shape of a document sheet (for example, a rectangle, quadrangle or the like). Upon determining that the obtained photographic image data includes characteristic points of document sheet image data, the document sheet image determining portion 202 determines whether or not the color of an area that includes the characteristic points of document sheet image data is a document sheet color (white, gray or the like) that has been registered in advance in a predetermined memory. Upon determining that the color of the area is the document sheet color, the document sheet image determining portion 202 determines that the photographic image data contains the document sheet image data.

Upon determining that the photographic image data does not contain the document sheet image data (FIG. 3: S102 NO) because, for example, the user merely passed in front of the multifunction peripheral 100, the document sheet image determining portion 202 discards the photographic image data, returns to S102, and repeats the determination each time the photographic image data is obtained.

On the other hand, upon determining that the photographic image data contains the document sheet image data (FIG. 3: S102 YES) because, for example, the user is holding a document sheet over the camera 101, the document sheet image determining portion 202 send a notification thereof to the operation determining portion 203. Upon receiving the notification, the operation determining portion 203 determines whether or not the photographic image data contains operation image data (FIG. 3: S103), wherein the operation image data shows a pattern of user's hand that corresponds to an operation for processing the document sheet image data.

Here, there is no restriction in particular to the method by which the operation determining portion 203 makes the determination. For example, the operation determining portion 203 may determine whether or not the photographic image data of the camera 101 includes characteristic points of the operation image data that have been registered in advance in a predetermined memory. The characteristic points of the operation image data may correspond to, for example, the shape of a part of human hand (for example, the back of the hand, the base of the hand, fingers of the like). Upon determining that the photographic image data includes the characteristic points of the operation image data, the operation determining portion 203 determines whether or not the color of an area that includes the characteristic points of the operation image data is a human hand color (skin color or the like) that has been registered in advance in a predetermined memory. Upon determining that the color of the area is the human hand color, the operation determining portion 203 then compares the pattern of the operation image data in the photographic image data with a plurality of operation patterns registered in advance in a predetermined memory, wherein the operation patterns indicate respective operations regarding processing of the document sheet image data. Upon determining, as a result of the comparison, that the pattern of the operation image data of the photographic image data matches any of the operation patterns, namely, when it is possible to determine a specific operation of processing uniquely from the operation image data in the photographic image data, the operation determining portion 203 determines that the photographic image data contains the operation image data.

Upon determining that the photographic image data does not contain the operation image data (FIG. 3: S103 NO) because, for example, the user is not holding his/her hand over the camera 101 while hesitating about the instruction, or holding a hand that does not correspond to the operation, the operation determining portion 203 discards the photographic image data, returns to S102, and repeats the determination each time the photographic image data is obtained.

On the other hand, upon determining in S103 that the photographic image data contains the operation image data (FIG. 3: S103 YES) because, for example, as shown in FIG. 4A, the user is holding over the camera 101 his/her hand in a certain pattern (for example, raising three fingers: index, middle and ring fingers) that corresponds to a predetermined operation (for example, printing three sheets of paper), the operation determining portion 203 sends a notification thereof to the user authentication portion 204. Upon receiving the notification, the user authentication portion 204 determines whether or not to execute a user authentication (FIG. 3: S104).

Here, there is no restriction in particular to the method by which the user authentication portion 204 makes the determination. For example, the user authentication portion 204 may reference user authentication execution information that has been stored in advance in a predetermined memory by the manager or the like. The user authentication execution information stored in the predetermined memory is either information (ON) indicating that the user authentication should be executed, or information (OFF) indicating that the user authentication should not be executed. This makes it possible to select either allowing only specific users to use the camera 101, or allowing even unspecific users to use the camera 101.

Here, when, "ON" is stored as the user authentication execution information, the user authentication portion 204 determines to execute the user authentication (FIG. 3: S104 YES), and determines whether or not face image data is contained in the photographic image data (FIG. 3: S105).

Here, there is no restriction in particular to the method by which the user authentication portion 204 makes the determination. For example, the user authentication portion 204 may determine whether or not the photographic image data of the camera 101 includes characteristic points of face image data that have been registered in advance in a predetermined memory, the face image data indicating human faces. The characteristic points of the face image data may correspond to, for example, the shape of a part of human face (for example, eyes, nose, mouth, eyebrows, ears). Upon determining that the photographic image data includes the characteristic points of the face image data, the user authentication portion 204 determines whether or not the color of an area that includes the characteristic points of the face image data is a human face color (skin color or the like) that has been registered in advance in a predetermined memory. Upon determining that the color of the area is the human face color, the user authentication portion 204 determines that the photographic image data contains the face image data.

Upon determining that the photographic image data does not contain the face image data (FIG. 3: S105 NO) because, for example, the user's face is not included in the photographing area 101a of the camera 101, the user authentication portion 204 discards the photographic image data, returns to S102, and repeats the determination each time the photographic image data is obtained.

Figure 4B:
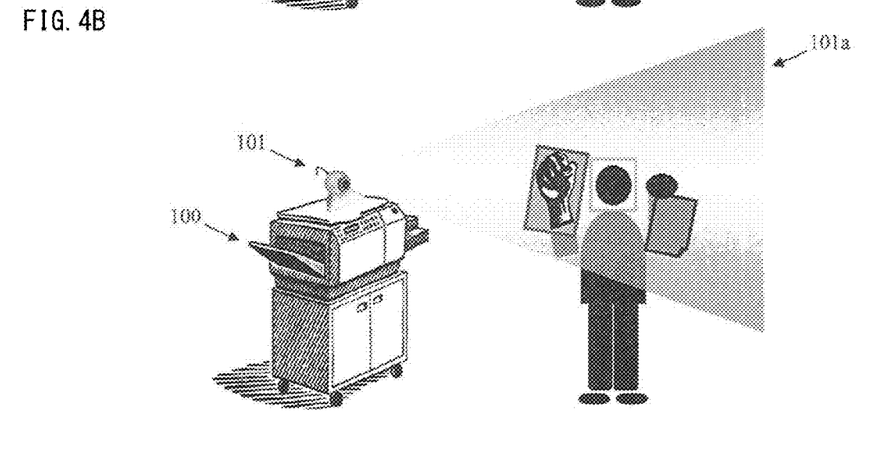
FIG. 4B shows an example of a case where document sheet image data, operation image data, and face image data are obtained by photographing according to an embodiment of the present disclosure.

On the other hand, upon determining in S105 that the photographic image data contains the face image data (FIG. 3: S105 YES) because, for example, as shown in FIG. 4B, the document sheet, the hand indicating some operation, and the face of the user are all included in the photographing area 101a of the camera 101, the user authentication portion 204 executes the user authentication based on the face image data (FIG. 3: S106). Specifically, the user authentication portion 204 may reference allowable face image data that has been registered in advance in a predetermined memory. The allowable face image data is image data of a face of a user who has been allowed to use the multifunction peripheral 100. The user authentication portion 204 then determines whether or not the face image data is identical with (on the same level as) the allowable face image data. The determination may be made by determining whether or not the pattern of the face in the face image data is identical with (on the same level as) the pattern of the face in the allowable face image data.

Upon determining that the face image data is not identical with the allowable face image data (FIG. 3: S106 NO), the user authentication portion 204 discards the photographic image data, returns to S102, and repeats the determination each time the photographic image data is obtained.

On the other hand, upon determining in S106 that the face image data is identical with the allowable face image data (FIG. 3: S106 YES), the user authentication portion 204 sends a notification thereof to the image processing portion 205. Upon receiving the notification, the image processing portion 205 executes processing of the document sheet image data based on an operation that corresponds to the operation image data.

In addition, when "OFF" is stored as the user authentication execution information, the user authentication portion 204 determines not to execute the user authentication (FIG. 3: S104 NO), and sends a notification thereof to the image processing portion 205. Upon receiving the notification, the image processing portion 205 executes processing of the document sheet image data based on an operation that corresponds to the operation image data.

Here, there is no restriction in particular to the method by which the image processing portion 205 executes processing. For example, first, the image processing portion 205 may sends a notification to the image correcting portion 206. Upon receiving the notification, the image correcting portion 206 corrects a harmful effect in the document sheet image data that was caused during the photographing with the camera 101 (FIG. 3: S107).

Figure 5A:
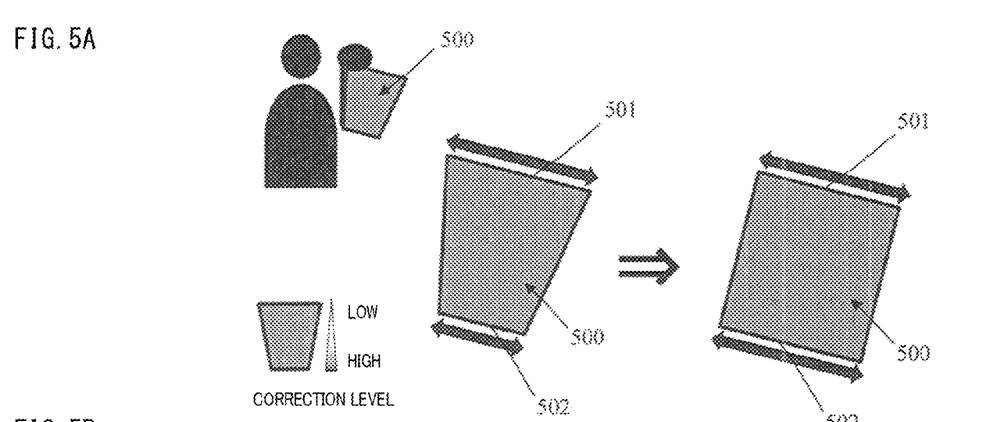
FIG. 5A shows an example of correction of the document sheet image data according to an embodiment of the present disclosure.

Here, there is no restriction in particular to the method by which the image correcting portion 206 performs the correction. For example, as shown in FIG. 5A, when the shape of the document sheet image data appears to be trapezoidal, not rectangular or square, depending on the angle of the camera 101 or how the document sheet is held by the user, the image correcting portion 206 detects a long side 501 and a short side 502 of a trapezoidal shape 500 in the document sheet image data, and makes a correction in such a way as to extend the short side 502 to be the same as the length of the long side 501. In this correction, the length of a portion between the long side 501 and the short side 502 is corrected such that the closer to the short side 502, the more the length is corrected. With this correction, the shape 500 in the document sheet image data can be modified to be rectangular or square.

Figure 5B:
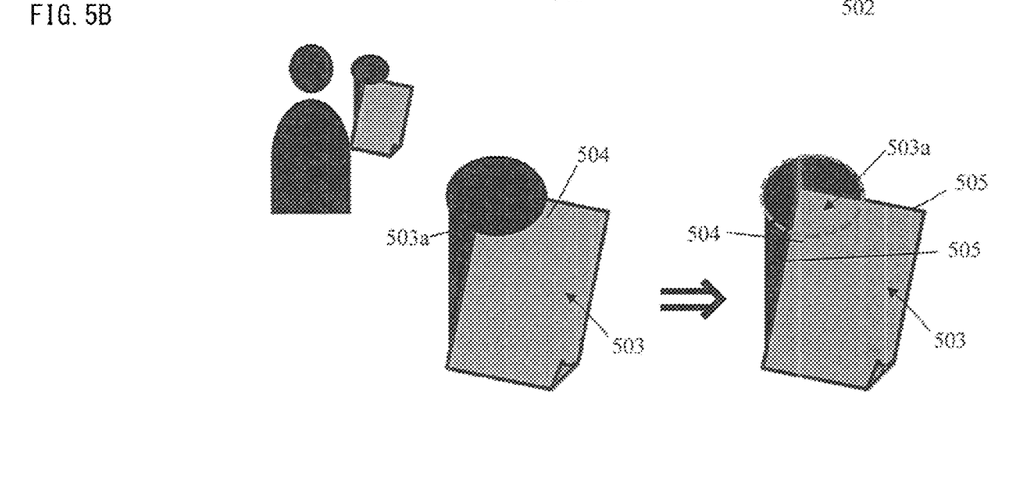
FIG. 5B shows an example of correction of the document sheet image data according to an embodiment of the present disclosure.

In addition, for example, as shown in FIG. 5B, since the document sheet is held by a hand, a part 503a hidden by the hand is generated in a document sheet image data 503. As a result, as a correction, the image correcting portion 206 paints out the hidden part 503a in the document sheet image data 503 with a background color of the document sheet image data 503. Here, a color that is most used in the whole document sheet image data 503 may be used as the background color. Alternatively, a color of a neighboring region 504 that is close to the hidden part 503a may be sampled, and the sampled color may be used as the background color. In addition, the hidden part 503a is assumed to form the document sheet image data 503 to be rectangular or square, based on end portions 505 of the document sheet image data 503 in the neighboring region 504. Such corrections make it possible to modify the document sheet image data 503 so as not to give incongruous feeling to the viewer.

Figure 6A:
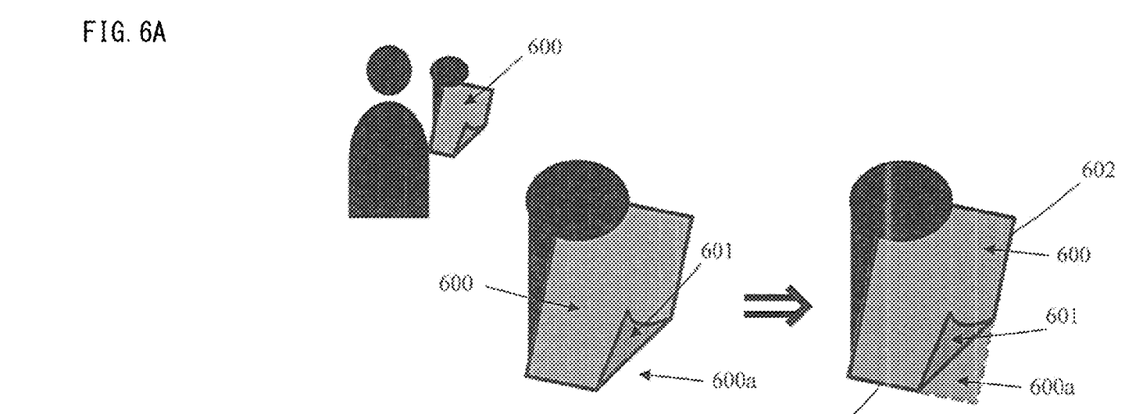
FIG. 6A shows an example of correction of the document sheet image data according to an embodiment of the present disclosure.

Furthermore, different from the case where image data is read from a document sheet laid on the document sheet table, when a document sheet is held by the user as shown in FIG. 6A for the document sheet image data 600 to be read with the camera 101, an edge portion 601 may be curled since no pressure such as a nipping pressure is applied to the document sheet. When the edge portion is extremely curled, the curled edge portion may overlap with the main body of the document sheet, and a blank portion 600a having no image data may be generated in the document sheet image data 600. As a result, as a correction, the image correcting portion 206 paints out the blank portion 600a of the document sheet image data 600 with a background color of the document sheet image data 600. The background color is determined as described above. In addition, as in the above-described case, the blank portion 600a is assumed to form the document sheet image data 503 to be rectangular or square, based on end portions 602, which are not curled, of the document sheet image data 600. After such corrections, even if the document sheet is curled, it is possible to obtain the document sheet image data 600 that will not give incongruous feeling to the viewer.

Back to the flowchart, upon completing the corrections, the image correcting portion 206 sends a notification thereof to the image processing portion 205. Upon receiving the notification, the image processing portion 205 executes processing of the document sheet image data based on an operation that corresponds to the operation image data (FIG. 3: S108). For example, as shown in FIG. 4A, when the operation instructs to print three sheets of paper, the image processing portion 205 executes printing three sheets of paper based on the document sheet image data. In addition, as shown in FIG. 4B, when the operation (clenched fist) instructs a facsimile transmission, the image processing portion 205 transmits the document sheet image data by facsimile to a predetermined transmission destination (address). In addition, when the user authentication has been executed, the image processing portion 205 transmits the document sheet image data by facsimile to a transmission destination associated with the authenticated face image data. Here, the transmission destination may be a facsimile number of the user himself/herself, or a facsimile number of another company. Furthermore, an e-mail transmission may be performed instead of the facsimile transmission. With this configuration, the user can perform the process of the document sheet image data without touching the operation portion of the multifunction peripheral 100. This increases the user's convenience.

It is noted that the present disclosure is suitable for processing a document sheet with such an image as a hand-written image or a big character that does not require a high quality. This configuration produces an advantageous effect that the user can execute processing with an extremely small amount of operation. For example, conventionally, regardless of type of a document sheet, the document sheet must be placed on a document sheet table or an automatic document sheet feeding portion. Thus, processing of a document sheet has at least a trouble of placing the document sheet, a trouble of inputting an instruction, and a trouble of collecting the document sheet. The present disclosure can reduce these troubles in a reliable manner.

Figure 6B:
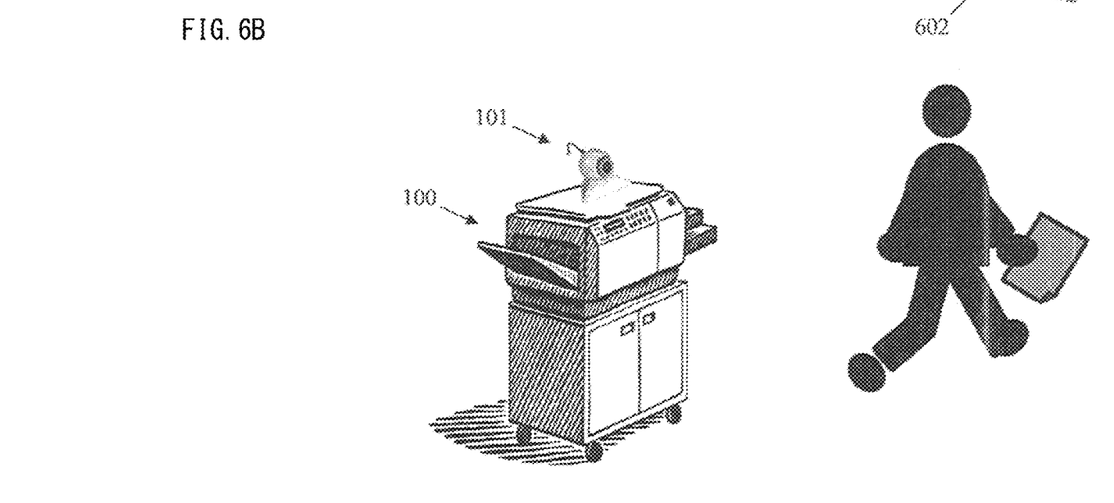
FIG. 6B shows an example of a case where the user leaves the multifunction peripheral according to an embodiment of the present disclosure.

In addition, as shown in FIG. 6B, the user can leave the multifunction peripheral 100 after confirming the completion of the processing. That is, with the present configuration, the user does not need to place the document sheet on the document sheet table. Thus, it prevents the user from forgetting to collect the document sheet, and thus improves the security. In addition, since the camera 101 is originally used for purposes of security, it is possible to improve the cost performance of the camera 101 by using the camera 101 for other purposes as those described above. It is noted that although the present disclosure is inappropriate for processing a document sheet with a fine image, it can process a document sheet with an image that is fine to some extent, due to the improvement in performance of the camera 101.

Figure 7A:
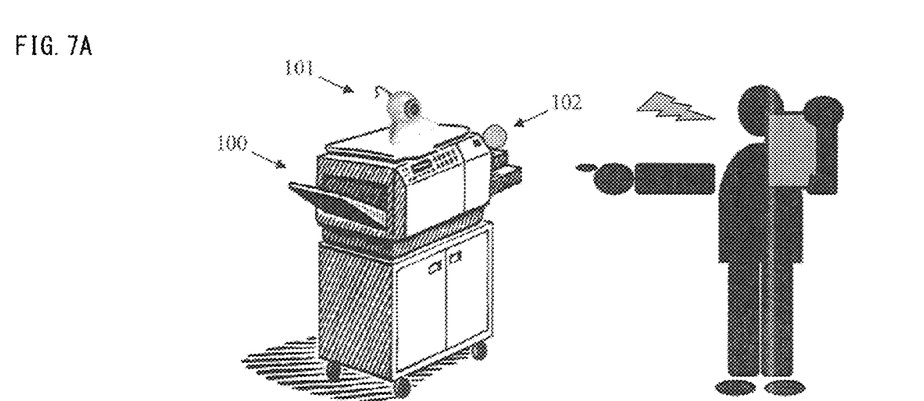
FIG. 7A shows an example of a case where a sound/voice input portion of an embodiment of the present disclosure is used.

Meanwhile, in the above-described embodiment, a simple input operation using a hand is performed. To print six sheets of paper for which five fingers are not sufficient or to transmit to a complicated transmission destination, the user's sound/voice may be used. For example, as shown in FIG. 7A, in the case where a microphone of the sound/voice input portion 102 is provided in the multifunction peripheral 100, when the user emits a sound/voice which corresponds to an operation (for example, "print six number of sheets") in S103, the operation determining portion 203 determines whether or not a sound/voice input via the sound/voice input portion 102 includes an operation sound/voice that corresponds to an operation for processing the document sheet image data (FIG. 3: S103). Here, there is no restriction in particular to the method by which the operation determining portion 203 makes the determination by the sound/voice. For example, the operation determining portion 203 compares the input sound/voice with a plurality of operation sounds/voices registered in advance in a predetermined memory, wherein the sounds/voices indicate respective operations regarding processing of the document sheet image data. Upon determining, as a result of the comparison, that the input sound/voice matches any of the operation sounds/voices, the operation determining portion 203 determines that the input sound/voice is an operation sound/voice. This enables an operation for processing the document sheet image data to be input by means of the user's sound/voice, without relying on the operation image data of the user's hand.

Figure 7B:
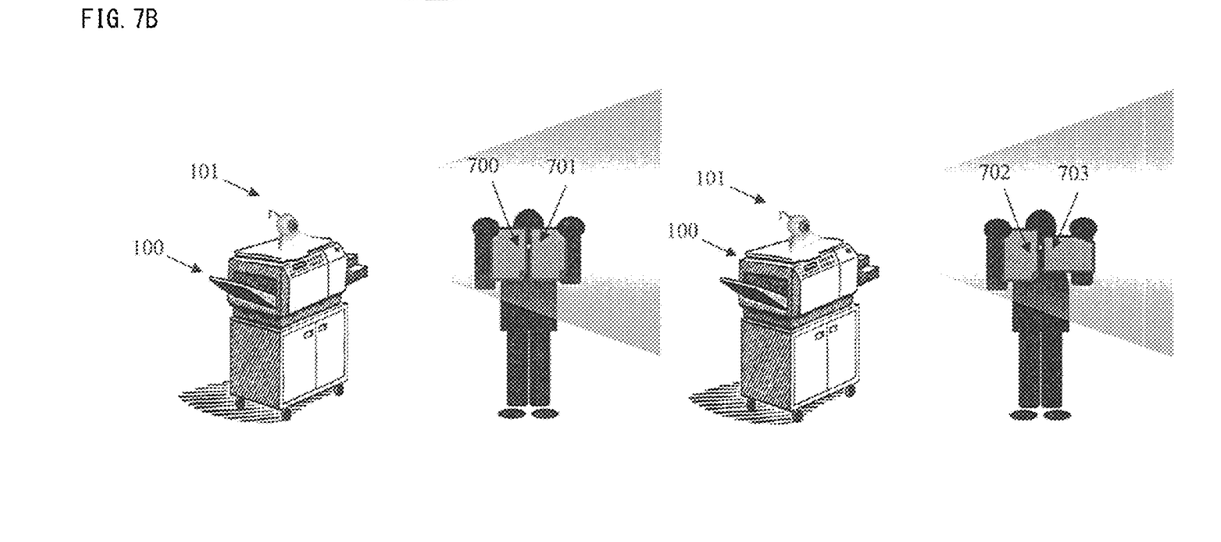
FIG. 7B shows an example of a case where two pieces of document sheet image data are obtained by photographing according to an embodiment of the present disclosure.

In addition, although one document sheet is used in the above-described embodiment, for example, two document sheets may be used by using a plurality of pieces of document sheet image data. For example, as shown in FIG. 7B, in the case where the user is holding two document sheets over the camera 101 with both hands, the document sheet image determining portion 202 determines in S102 that the image data of an image photographed by the camera 101 contains two pieces of document sheet image data 700 and 701 (FIG. 3: S102 YES).

Here, when the two pieces of document sheet image data 700 and 701 are both rectangular, the document sheet image determining portion 202 combines them as one piece of document sheet image data. On the other hand, when one of the two pieces of document sheet image data 700 and 701 is a vertically long rectangle, and the other is a horizontally long rectangle, the document sheet image determining portion 202 combines them as one piece of document sheet image data by either changing the vertically long one to a horizontally long one or changing the horizontally long one to a vertically long one, or combines them as one piece of document sheet image data by keeping the orientations of them as they are. This makes it possible to execute processing in the 2-in-1 mode. In addition, it may be configured such that the user emits sound/voice so as to select between the 2-in-1 mode and the regular mode (the two pieces of document sheet image data 700 and 701 are processed separately).

In the above-described embodiment, the multifunction peripheral 100 (image processing apparatus) includes the control portion 201 and the portions 202-206. However, not limited to this, programs for realizing the control portion 201 and the portions 202-206 may be stored in a storage medium, and the storage medium may be provided. According to this configuration, the programs are read into the image processing apparatus, and the image processing apparatus realizes the portions. In that case, the programs read from the storage medium produce the acts and effects of the present disclosure. Furthermore, the present disclosure may be provided as a method for storing the steps that are executed by the portions, onto a hard disk.

As described above, the image processing apparatus and the image processing method of the present disclosure are useful for a copier, a printer and the like, as well as for a multifunction peripheral, and are effective as an image processing apparatus and an image processing method that enable document sheet image reading and operation input to be performed easily.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
  a camera;
  a document sheet image determining portion configured to determine whether or not two pieces of document sheet image data are contained in photographic image data that has been obtained by photographing with the camera installed on the image processing apparatus;
  an operation determining portion configured to determine whether or not operation image data is contained in the photographic image data by determining whether or not the photographic image data includes image data showing both hands of a user each holding a document sheet over the camera, the hands representing an operation corresponding to processing in a 2-in-1 mode in which the two pieces of document sheet image data are combined to one piece of document sheet image data; and
  an image processing portion configured to execute the processing in the 2-in-1 mode of combining the two pieces of document sheet image data to one piece of document sheet image data based on the operation corresponding to the operation image data when the document sheet image determining portion determines that the two pieces of document sheet image data are contained in the photographic image data and the operation determining portion determines that the operation image data is contained in the photographic image data.

2. The image processing apparatus according to claim 1 further comprising:
  a user authentication portion configured to determine whether or not the photographic image data contains face image data showing a face of a user, and executes a user authentication based on the face image data contained in the photographic image data.

3. The image processing apparatus according to claim 2, wherein
  in a case where the document sheet image data is transmitted after an execution of the user authentication, the image processing portion transmits the document sheet image data to a transmission destination associated with the face image data.

4. The image processing apparatus according to claim 1 further comprising:
  an image correcting portion configured to correct a harmful effect in the document sheet image data that was caused during the photographing with the camera.

5. The image processing apparatus according to claim 1 further comprising:
  a sound/voice input portion, wherein
  the operation determining portion determines whether or not a sound/voice input via the sound/voice input portion includes an operation sound/voice that corresponds to an operation for processing the document sheet image data, and
  the image processing portion executes the processing of the document sheet image data based on the operation corresponding to the operation sound/voice.

6. An image processing method comprising:
a document sheet image determining step of determining whether or not two pieces of document sheet image data are contained in photographic image data that has been obtained by photographing with a camera installed on an image processing apparatus;
an operation determining step of determining whether or not operation image data is contained in the photographic image data by determining whether or not the photographic image data includes image data showing both hands of a user each holding a document sheet over the camera, the hands representing an operation corresponding to processing in a 2-in-1 mode in which the two pieces of document sheet image data are combined to one piece of document sheet image data; and
an image processing step of executing the processing in the 2-in-1 mode of combining the two pieces of document sheet image data to one piece of document sheet image data based on the operation corresponding to the operation image data when the document sheet image determining step determines that the two pieces of document sheet image data are contained in the photographic image data and the operation determining step determines that the operation image data is contained in the photographic image data.

* * * * *